United States Patent [19]

Adachi et al.

[11] Patent Number: 5,777,991
[45] Date of Patent: Jul. 7, 1998

[54] PERSONAL COMMUNICATION APPARATUS WITH CALL SWITCHING MODEM AND PACKET SWITCHING MODEM

[75] Inventors: Yoshinori Adachi; Kazuo Kobayashi; Masaji Ebihara, all of Tokyo, Japan

[73] Assignee: Mitsubishi Denki Kabushiki Kaisha, Tokyo, Japan

[21] Appl. No.: 591,133

[22] Filed: Jan. 25, 1996

[30] Foreign Application Priority Data

Jan. 27, 1995 [JP] Japan ................................. 7-011826

[51] Int. Cl.[6] .............................. H04L 12/64; H04Q 7/32
[52] U.S. Cl. ........................ 370/352; 455/552; 455/557; 455/575
[58] Field of Search ........................... 370/352, 353, 370/354, 465, 474, 477, 338; 375/222, 295, 316; 455/73, 90, 74, 78, 550, 551, 552, 553, 557, 575

[56] References Cited

U.S. PATENT DOCUMENTS

| | | | |
|---|---|---|---|
| 4,887,265 | 12/1989 | Felix | 370/333 |
| 5,404,392 | 4/1995 | Miller et al. | 379/60 |
| 5,528,664 | 6/1996 | Slekys et al. | 370/352 |
| 5,533,019 | 7/1996 | Jayapalan | 370/352 |
| 5,546,382 | 8/1996 | Fujino | 370/352 |

FOREIGN PATENT DOCUMENTS 6224989   8/1994   Japan.

*Primary Examiner*—Chi H. Pham
*Assistant Examiner*—Ricky Q. Ngo
*Attorney, Agent, or Firm*—Wolf, Greenfield & Sacks, P.C.

[57] ABSTRACT

A personal communication apparatus is disclosed, which comprises a radio transmitter 64 and a radio receiver 66 for participating in communication, a microphone 60, a loudspeaker 61, a processor 90 as a controller for controlling call switching communication and packet switching communication, a ROM 100 and a RAM 101 for storing control programs and data, a call switching modem 80 for modulating signal in the speech frequency band, and a packet switching modem 82 for modulating signal in a frequency band exceeding the speech frequency band. The outputs of the microphone 60 and call switching modem 80 are bandwidth limited by a transmission signal processing circuit 72. Communication by the packet switching modem is carried out according to a communication program. The apparatus is capable of stand alone call switching communication and also of packet switching communication, as well as functioning as a radio telephone set.

24 Claims, 9 Drawing Sheets

PERSONAL COMMUNICATION APPARATUS WITH CALL SWITCHING MODEM AND PACKET SWITCHING MODEM

BACKGROUND OF THE INVENTION

1. Field of the Invention

This invention relates to communication systems and, more particularly, to a personal communication apparatus with a radio transmitter and a radio receiver for transmitting and receiving speech or the like, respectively, a microphone for receiving speech or the like to be transmitted, and a loudspeaker for outputting received speech or the like.

2. Prior Art

The popularity of commonly called personal communication systems, such as portable cellular telephones or car telephones, is rapidly increasing. One such personal communication apparatus as disclosed in Japanese Patent Laid-Open Publication No. Hei 6-224989 (hereinafter referred to as prior art scheme) will now be summarized. Briefly, a feature of this prior art apparatus is a PC (personal computer) of portable telephone type.

FIG. 1 shows the constitution of the prior art apparatus. As shown, the apparatus mainly comprises a transceiver 12, a modem 14 and a central processing unit 16, these constituent elements being hereinunder described in detail.

(1) Transceiver 12

The transceiver 12 includes radio transceiver (hereinafter referred to as RF) logic 42, speech logic 44 and power logic 46. The speech logic 44 has an amplifier, a D/A converter and other elements that are necessary for the generation and reception of speech signals. The power logic 46 supplies power from a main battery 34 to various elements of the transceiver 12.

A loudspeaker 52 and a microphone 54, which permit user's speech communication, are connected to the speech logic 44. A bell 50 is further connected to the speech logic 44 to notify the user of telephone calls to.

(2) Modem 14

The modem 14 includes a modem controller 36 and a DSP (digital signal processor) 38. The modem 14 is connected via buses 15 and 25 to the transceiver 12 and the central processing unit 16. It can also be connected via a connector 40 to a different modem or a PC.

(3) Central Processing Unit 16

The central processing unit 16 includes a processor 20, a back-light circuit 22, an LCD 24 and a touch screen 26. To the processor 20 are connected such memories as a RAM 27 and a ROM 29 for storing programs and data. The unit 16 further includes power control logic 18, to which a main battery 34 and an auxiliary battery 30 are connected. To the unit 16 are further connected a number of push buttons 32 for power supply on-off operation and sound volume control. This prior art apparatus does not have any disk drive. Instead, it has a port 31 for an IC card 28.

While the hard ware of the prior art apparatus has so far been described, a feature of the scheme resides in the software (not shown) thereof. The scheme adopts an operating system for control. Thus, a perfect PC constitution is realized in both software and hardware. In addition, the apparatus further comprises an internal navigation file for monitoring the start and sequence of execution of applications which are executed to provide various functions. The navigation file make it unnecessary for the user to return to the main menu every time the apparatus is operated, thus permitting ready and prompt switching from a certain application over to a different one. This prior art scheme can realize the following functions.

(1) Portable Telephone Function

The scheme can be utilized as an ordinary portable telephone set.

(2) PC Function

The scheme is capable of complicated PC processes although certain limitations are imposed on the ease of operation. It can realize such functions as electronic mail and telephone directories, which can not be obtained with a normal portable telephone set.

(3) Line Switching System Data Communication Function

The apparatus permits data communication with the chip of the modem controller 36. This data communication function, like the portable telephone function, is realized via a telephone network by utilizing the transceiver 12. Hereinafter, the modem of line switching type as described above for modulating and demodulating signals in the speech frequency band (500 Hz to 3 kHz), is referred to as a "line switching modem", and communication by this modem is referred to as "line switching communication".

As shown above, the prior art scheme incorporates PC functions in the portable telephone system, thus making it possible to greatly expand these functions while making use of the portability of the portable telephone. However, improvements have been desired in connection with the data communication function in a frequency range exceeding the speech frequency band (specifically 3 kHz and above). In high transfer rate data communication, the transfer rate exceeds the speech frequency band in terms of the frequency. Frequently, such data communication is made as packet communication, so the high transfer rate data communication is hereinafter referred to as "packet switching communication".

Although the prior art apparatus has the line switching modem, for the packet switching communication it is necessary to connect a separate modem or a PC to the connector 40 noted above. This is because the apparatus does not have a Modem for the packet switching communication (hereinafter referred to as "packet switching modem"). In this connection, the following background has to be considered.

In data communication utilizing a portable telephone or car telephone, systems for FM modulating data in the speech frequency band have mainly been adopted in order to be able to utilize existing analog telephone networks (such as PSTN). In this case, it is possible to utilize, for instance, NTT in Japan or AMPS in U.S.A. as a portable telephone network. In order to be able to make effective use of existing infrastructures, the installation of the line switching modem has been necessary in personal communication apparatus.

This modem enables data communication and FAX communication services (hereinafter referred to as "non-speech communication") as well as speech communication. The packet switching modem, on the other hand, requires preliminary arrangement of new infrastructures. Therefore, scarce commercial demand was found for the provision of this modem. Besides, the provision of this modem requires type of the addition of an exclusive radio transceiver. Actually, there were no product projects or design concepts for providing a packet switching modem.

However, in 1994, services based on a new communication system began, although in a trial stage, giving rise to the possibility of a great change in the above commercial trend in the coming years. The new communication system that was introduced is called CDPD (cellular digital packet data) system, and today it is giving rise to increased prospects of commercial demands for personal communication systems utilizing CDPD.

CDPD is designed for high transfer rate packet transmission of data by utilizing a vacant channel in AMPS communication. A feature of the CDPD communication resides in that the same radio transceiver as for the AMPS communication can be utilized for data communication. It is thus possible to avoid the cumbersomeness that arises in the case of adding an exclusive radio transceiver. Moreover, CDPD is excellent in data transfer rate (up to 19.2 kbps), reliability and data security, and it is forecast that demands for related communication systems will rise quickly in over the next several years.

SUMMARY OF THE INVENTION

In light of the foregoing, it is an object of the invention to provide a personal communication apparatus, which comprises not only a call switching modem as in the above prior art scheme but also a packet switching modem such that the two modems can be suitably selected according to the operating mode to realize the following functions:

1. A normal radio telephone function.
2. A function of obtaining packet switching communication only, i.e., without connecting any external modem or PC, and
3. A line switching modem function for line switching communication from a PC when the PC is connected to the apparatus.

According to one aspect of the invention, the above object of is attained by a personal communication apparatus with a radio transmitter and a radio receiver for respectively transmitting and receiving at least speech, a microphone for receiving speech to be transmitted, and a loudspeaker for outputting received speech, comprising a processor for controlling the overall apparatus in each operating mode, an input accepting portion for accepting an input from the user for designating an operation of the apparatus, a memory portion for storing programs to be executed or referred to by the processor and also storing data; a line switching modem for executing modulation of digital data capable of being processed by the processor to obtain an analog signal in the speech frequency band and also demodulation in the converse way, a packet switching modem for executing modulation of digital data capable of being processed by the processor to obtain an analog signal in a frequency region exceeding the speech frequency band and also demodulation in the converse way, a transmission signal processing portion for carrying out bandwidth restriction processing on a speech base-band signal inputted from the microphone and also an analog signal from the call switching modem, a transmission signal selecting portion for selectively connecting either the transmission signal processing portion or the packet switching modem to the radio transmitter, according to the operating mode of the apparatus for transmitting data, a transmission program for radio transmitting desired data among the data stored in the memory portion via the packet switching modem when the packet switching modem is connected to the radio transmitter, a received signal processing portion for carrying out bandwidth restriction processing on a signal received by the radio receiver, a modem control portion for detecting whether or not the call and packet switching modems are to be operated according to the operating mode of the set for receiving data, and a loudspeaker control portion for deciding whether the bandwidth restriction signal obtained in the received signal processing portion is to be outputted to the loudspeaker according to the operating mode of the apparatus for receiving data, the individual constituting elements set forth being accommodated in a single housing.

With the constitution as described, normal speech communication is possible with the radio transmitter, radio receiver, microphone and loudspeaker. For communication using the call or packet switching modem, the processor controls each operating mode of the set. For the control, the processor refers to programs and data stored in the memory portion.

The line switching modem executes modulation and demodulation in the speech frequency band, while the packet switching modem executes modulation and demodulation in a frequency region exceeding the speech frequency band. The transmission signal processing portion carries out bandwidth restriction processing on a speech base-band signal inputted from the microphone and modulated analog signal from the line switching modem. The signal that is obtained in this way does not always constitute a subject of transmission.

Either the transmission signal processing portion or the packet switching modem is selectively connected to the radio transmitter according to the operating mode of the apparatus for transmitting data.

When the packet switching modem is connected to the radio transmitter, the transmission program permits radio transmission of desired data via this modem. In this case, the apparatus does not require any external modem or PC.

The received signal processing portion carries out bandwidth restriction processing on the signal received by the radio receiver. The modem control portion makes a decision as to whether the call or packet switching modems are to be operated according to the operating mode of the apparatus for receiving data. Also, the received signal processing portion makes a decision as to whether the bandwidth restriction processed signal is to be outputted to the loudspeaker according to the operating mode of the apparatus for receiving data.

It is thus possible to obtain communication using the call or packet switching modem as well as the ordinary speech communication. Particularly, it is possible to obtain communication using the packet switching modem without the use of any external modem or PC, thus solving the problems inherent in the prior art.

According to another aspect of the invention, a PC interface portion is provided for permitting transfer of data between the apparatus and a PC. By permitting this communication as serial data type communication, the interface cable can be made lighter, and can be easily connected to the modem.

According to a further aspect of the invention, a data editing portion is provided for editing digital data capable of being processed by the processor. Owing to this portion, data to be transmitted can be generated and edited inside the apparatus.

According to a still further aspect of the invention, an information display portion is provided for visually displaying predetermined information according to a processor instruction, and also timer is provided for detecting the time to be referred to in each operating mode of the set. These portions are provided for the user's convenience.

According to a yet further aspect of the invention, a transmission time designating portion is provided for designating a time of transmission of desired digital data by the radio transmitter. The desired digital data is transmitted automatically when the time designated by the transmission time instant designating portion reaches the time detected by the time detecting portion.

According to still another aspect of the invention, a reception time recording portion is provided for recording the time detected by the time detecting portion upon generation of data reception by the radio receiver. Also, a reception notifying portion is provided for notifying of data reception by the radio receiver upon the occurrence of data reception. Further, the occurrence of the data reception is notified with generation of vibrations or an audible sound.

According to an yet another aspect of the invention, the vibrations or audible sound generated by the reception notifying portion vary or varies in frequency, intensity or duration depending on whether the received signal is to be outputted to the loudspeaker, demodulated by the line switching modem or demodulated by the packet switching modem. The user can thus readily know the type of reception.

According to a further aspect of the invention, the line switching modem modulates the digital data into an analog signal capable of being transmitted in an AMPS communication system, while the packet switching modem modulates the digital signal into an analog signal capable of being transmitted in a CDPD communication system. The line switching communication uses the AMPS communication system, while the packet switching communication uses the CDPD system. It is thus possible to provide a wide range of services.

According to a further aspect of the invention, the line switching modem modulates the digital data using QAM modulation, while the packet switching modem modulates the digital data using GMSK modulation. These modems thus match the AMPS and CDPD communication systems, respectively.

According to a further aspect of the invention, an information display portion is provided for visually displaying predetermined information according to an instruction of the processor. Notification being shown on the information display portion when a radio line, through which the packet switching modem transmits data, is captured. The user can thus know the time of giving an instruction for data transmission.

According to a further aspect of the invention, the input accepting portion includes 10 keys for displaying at least numerals "0" to "9", and the apparatus further comprises a character generating portion for converting combination inputs of the keys into characters other than numerals. It is possible to input characters using combinations of the 10 numerical keys. It is thus possible to reduce the total number of keys.

According to a further aspect of the invention, as the reception waiting mode, the apparatus can be set to mode A, in which only the operation of the line switching modem is allowed, and mode B, in which only the operation of the packet switching modem is allowed. It is possible to set a reception waiting mode that is suited to the user's convenience.

According to a further aspect of the invention, a power turn-off portion is provided for turning off power supplied to a circuit portion concerning the mode B when the mode A is set up as the reception waiting mode and turning off power supplied to a circuit portion concerning the mode A when the mode B is set up as the reception waiting mode. According to the reception waiting mode, no power is supplied to an unnecessary circuit portion. It is thus possible to reduce power consumption.

According to a further aspect of the invention, a mode switching portion is provided for switching the modes A and B on a time division basis. It is thus possible to await reception in both modes.

According to a further aspect of the invention, the set permits setting a mode thereof which allows the operation of at least the packet switching mode when awaiting reception, and it further comprises a modulated data judging portion for judging the content of digital data demodulated by the packet switching when it is in the above mode, the digital data being transmitted through the personal computer interface portion to the personal computer when it is judged that the digital data is to be transmitted to the PC. When it is judged that the digital data demodulated by the packet switching modem has a content to be transmitted to the PC, it can be automatically transmitted thereto via the PC interface portion.

According to a further aspect of the invention, the modulated data judging portion judges digital data demodulated by the packet switching modem to have a content to be transmitted to the personal computer when a header part of the data can not be incapable of interpreted by the apparatus itself.

According to a further aspect of the invention, the apparatus further comprises a data editing portion for editing digital data capable of being processed by the processor, and a PC data judging portion for judging the content of data transmitted from the PC through the PC interface portion. The data transmitted from the PC is transferred to either the line switching modem, or the packet switching modem or the data editing modem according to the result of the judgment. The data transmitted from the PC is transferred automatically to either the call switching modem, the packet switching modem or the data editing modem as desired, according to its content.

According to a further aspect of the invention, the PC data judging portion judges the data content according to the kind of communication command transmitted from the PC. It is thus possible to determine the data destination readily and reliably.

According to a further aspect of the invention, the set further comprises a monitoring portion for monitoring generation of a request for setting each operating mode, a judging portion for judging the content of the operation mode set up by the mode setting request, and a judging portion for judging a plurality of operating modes capable of being set up simultaneously according to the operating mode setting request. Thus, a plurality of operating modes that can be set up simultaneously, can be executed simultaneously.

According to a further aspect of the invention, the mode setting request is an interruption request to the processor. This permits ready and reliable acceptance of the mode setting request.

BRIEF DESCRIPTION OF THE DRAWINGS

The above and other objects, features and advantages of the invention will become more apparent from the following detailed description of the preferred embodiment when the same is read with reference to the accompanying drawings, in which.

DETAILED DESCRIPTION OF THE PREFERRED EMBODIMENT

A preferred embodiment of the invention will now be described with reference to the drawings.

Figure 1:
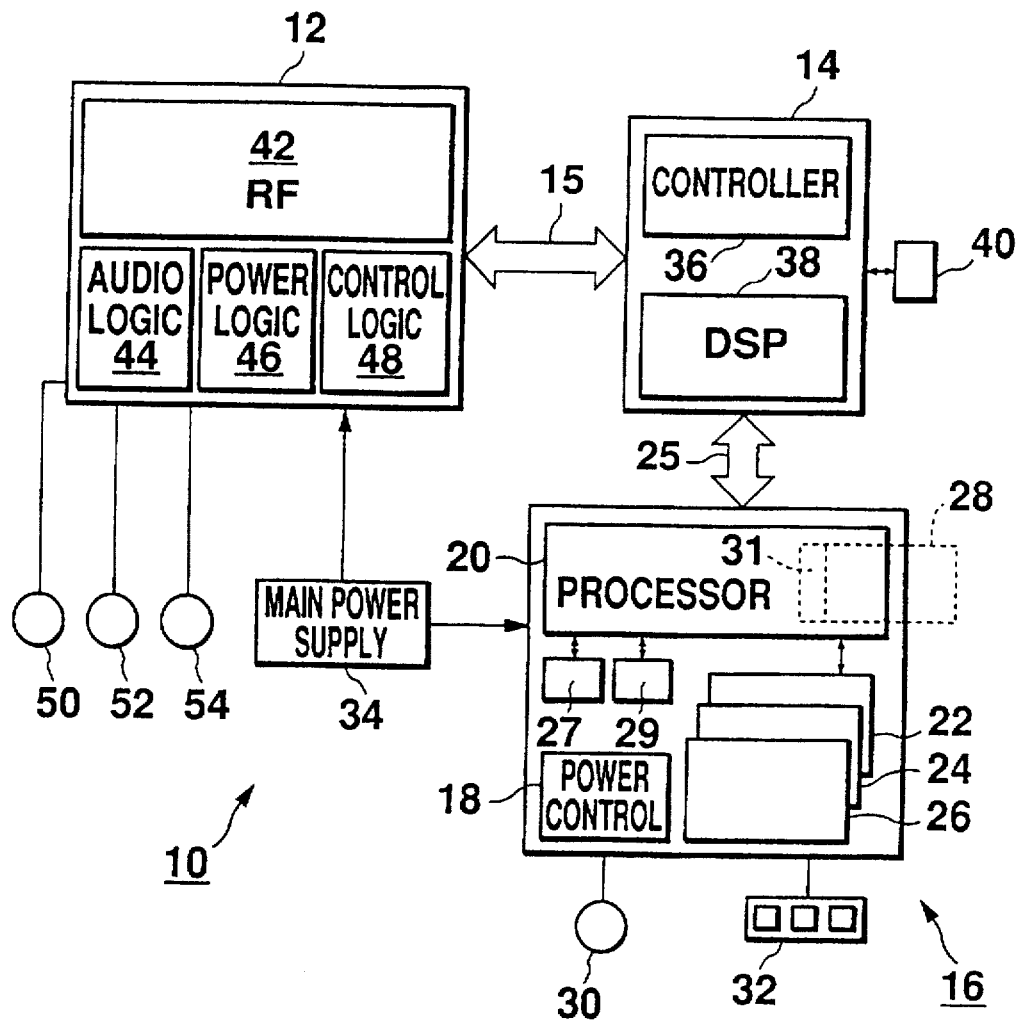
FIG. 1 is a block diagram showing a prior art apparatus disclosed in Japanese Patent Laid-Open Publication No. Hei 6-244989.
Figure 2:
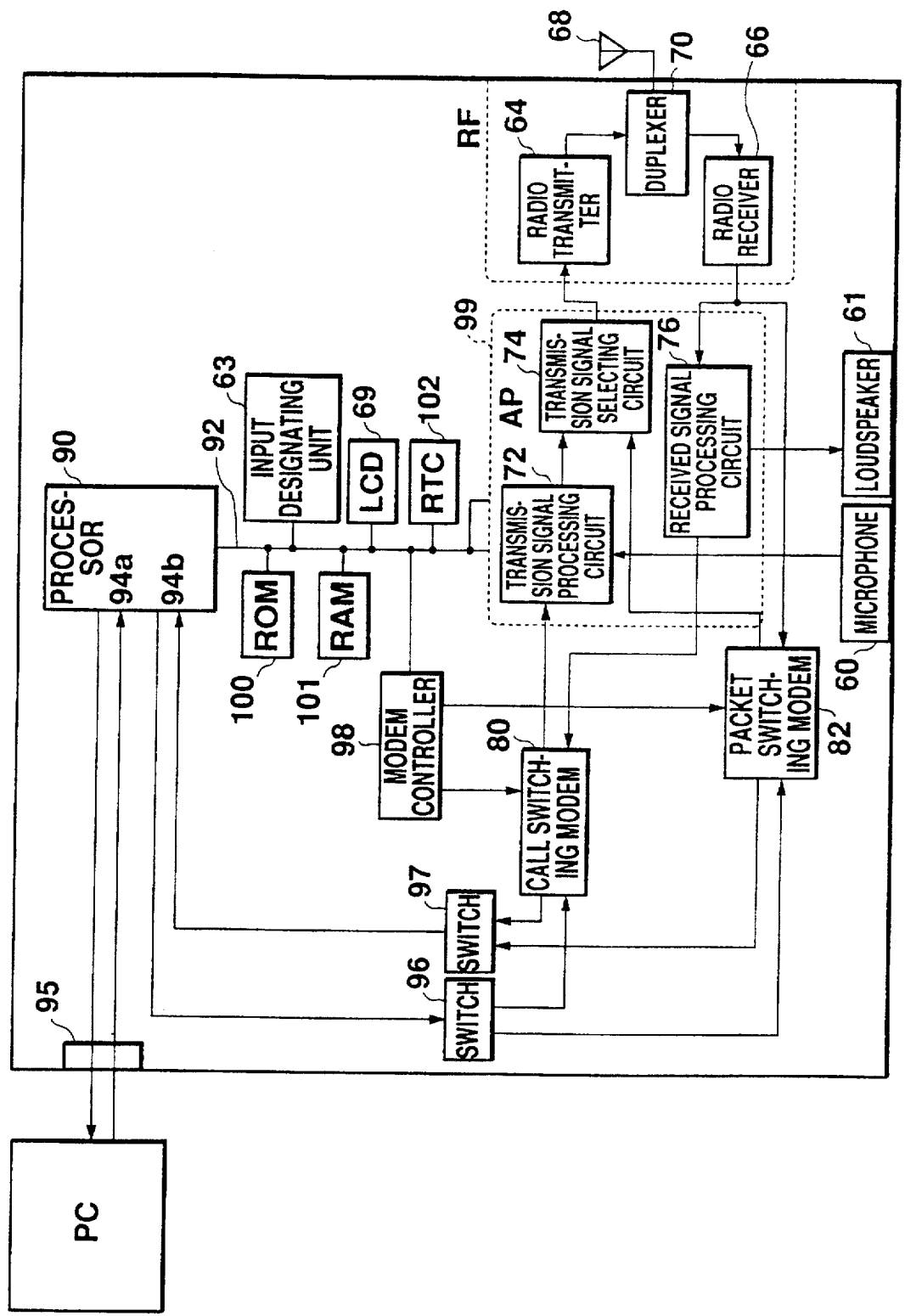
FIG. 2 is a block diagram showing the hardware constitution of an embodiment of the personal communication apparatus according to the invention.
Figure 3:
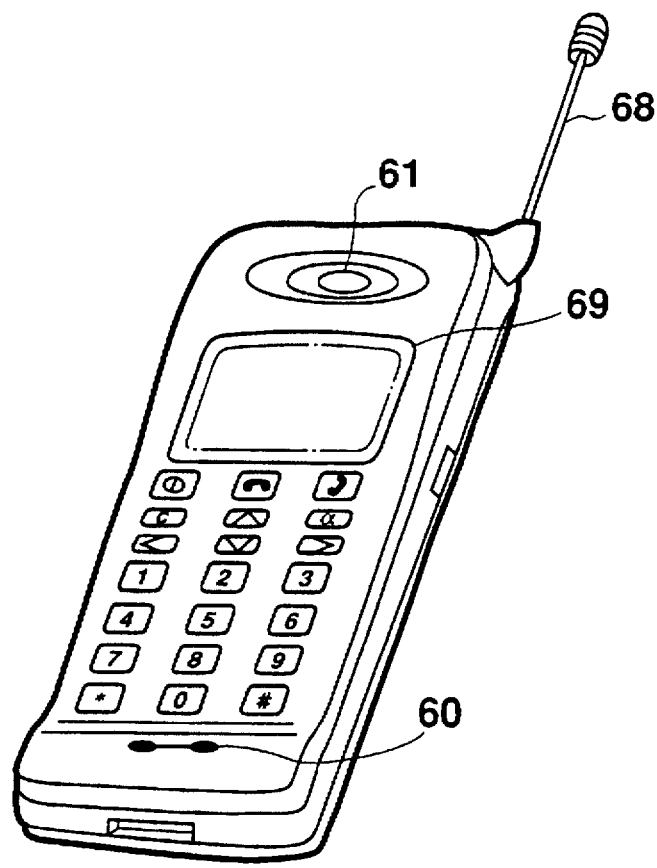
FIG. 3 is a perspective view showing the embodiment of the personal communication apparatus.

FIG. 2 shows the hardware constitution of the embodiment of the personal communication apparatus according to the invention. This set can be regarded as a radio telephone set having a line switching modem and a packet switching modem. As shown in FIG. 3, it has substantially the same appearance as a normal portable telephone apparatus. Its hardware constitution will now be described element by element, as shown in the block diagram of FIG. 2.

(1) Basic Constitution Realizing Radio Telephone Function

Basic elements which are necessary for communication, are a microphone 60 which user's speech is inputted to, a loudspeaker 61 which outputs speech of the opposite side person the user is talking to, a radio transmitter 64 and a radio receiver 66 for radio transmitting and receiving speech, respectively, an antenna 68 for radio communication, a duplexer 70, an LCD 69 as a display portion having the role of a man-machine interface, and 10 keys of numerals "0" to "9" for inputting telephone Nos. Other Keys for ending communication, moving a cursor, volume control, muting, etc. are also provided. The keys can be used for designating various operations of the apparatus in addition to realizing such telephone functions as inputting telephone Nos. In FIG. 2, these keys are collectively shown as a designation input unit 63.

In the apparatus as shown, a transmission signal processing circuit 72 carried out bandwidth restriction processing on a speech base-band signal inputted from the microphone 60, and a speech frequency band analog signal thus generated is transmitted by the radio transmitter 64. A transmission signal selecting circuit 74 is provided between the transmission signal processing circuit 72 and the radio transmitter 64. This circuit 74 selects a signal to be finally radio transmitted according to the transmission mode of the apparatus in order to permit transmission from a call switching modem 80 and a packet switching modem 82, these modems being described later. The transmission signal processing circuit 72 carries out bandwidth restriction processing signals transmitted and received by the line switching modem 80 as well. It is assumed that the embodiment utilizes an AMPS communication network. This permits a wide scope of services to be provided in the U.S.A. Of course it is possible to use other communication networks as well.

As for the reception route, a signal received by the radio receiver 66 is coupled to two different branches. Firstly, the received signal is directly fed to the packet switching modem 82. Secondly, it is fed via a received signal processing circuit 76 to the loudspeaker 61 and the line switching modem 80. The received signal processing circuit 76 carries out bandwidth restriction processing on the received signal for noise reduction.

While the received signal is coupled to the two different branch routes, in this embodiment an effective route is designated by setting a corresponding reception waiting mode. Specifically, the set is set in either mode A, in which only the line switching modem 80 is allowed to await reception, or mode B, in which only the packet switching modem 82 is allowed to await reception. Normal communication is possible in the mode A. The provision of the two modes permits reception waiting desired by the user.

When reception takes place in the mode A, a decision is made as to whether the received signal is to be processed in the line switching modem 80 or merely outputted from the loudspeaker 61. This judgment is made by a modem driver to be described later using the call switching modem 80. When the received signal is for the line switching modem 80 and results in meaningless speech as an output of the loudspeaker 61, its output therefrom is prohibited.

It is to be appreciated that the radio telephone function can be realized with an equivalent circuit constitution to conventional radio telephones except for the transmission signal selecting circuit 74 and the mode setting. When the reception takes place in the radio receiver 66, the apparatus can adopt a commonly used bell for generating an audible sound or a structure for generating vibrations. The alarm may be issued not only at the time of a normal call but also at the time of reception in (2) or (3) described hereinunder. The audible sound or the vibrations may be varied in frequency, intensity, duration, etc. (depending on the type of reception.)

(2) Constitution for Realizing Packet Switching Communication Function

This function is to permit packet switching communication only apparatus of the present invention, i.e., without connection of any external modem or a PC. This function dispenses with the connection of an external modem, a PC, etc. which has been necessary for conventional packet switching communication. Specifically, it permits generation and editing of communication subject data in the apparatus of the present invention, and digital modulation of the data in a frequency region exceeding the speech frequency band for high transfer rate data transmission and reception. It can be thought of as a bi-directional pager function in this aspect. The received data can be displayed on the LCD 69. Taking this function into consideration, target data for the packet switching communication is called a "message", which will be discriminated from the usual speech signal and the non-speech communication signal processed by the fine switching modern.

To realize the function, the present invention has a hardware constitution similar to a normal PC. Specifically, the apparatus includes a processor 90, which collectively controls the set in each operating mode. The processor 90 has an address bus, a data bus and a control bus, these buses being collectively shown as bus 92 in FIG. 2. It permits serial data type communication. To this end, it has two data input/output ports 94a and 94b. The port 94a is connected to a connector 95 for connecting a PC or similar external system. As the interface in this connection, RS-232C is adopted. By adopting the serial data communication system, the interface cable can be made lighter, and can be easily connected to the modem. In (2), the packet switching communication is realized with the present apparatus alone, and an interface with a PC (hereinafter referred to as "PC interface") is necessary for analog communication in (3). It is of course possible as well to connect a PC to the present apparatus for packet switching communication of the PC data by the apparatus. In this case, the PC interface is used.

The other port 94b is connected via switches 96 and 97 to the packet switching modem 82. The modem 82 modulates serial data inputted from the port 94b of the processor 90 into digital data in a frequency region exceeding the speech frequency band and also demodulates signal received by the radio receiver 66 into serial data outputted to the port 94b. It is assumed that the present embodiment adopts or GMSK modulation system and that the modulated signal is sent out from the radio transmitter 64 onto a CDPD communication network. Thus, like the existing AMPS communication, a wide range of services can be provided. The determination of the destination in CDPD communication, unlike the usual telephone No., is based on IP (internet protocol) No.

A modem controller 98 is provided for collectively controlling the call and packet switching modems 80 and 82. The modem controller 98 controls the state and operation, such as the selection of the modes A and B noted above, of the two modems according to modem driver instructions. In this embodiment, it is assumed that the transmission signal processing circuit 72, transmission signal selecting circuit 74 and received signal processing circuit 76 are integrated in a single IC as an audio processor (hereinafter abbreviated as AP) as shown enclosed in a dashed rectangle 99. This is done in order to reduce the size of the apparatus by integrating the circuits that are more or less alike in functions. The AP 99 is controlled by an AP driver which will be described later.

Connected to the bus 92 are memories for storing various programs and data to be executed or referred to by the processor 90. The memories are roughly classified into a ROM 100 for storing system programs and a RAM 101 used for system program work areas. The ROM 100 is a flash memory to permit ready system updating, and the RAM 101 is an SRAM to permit ready battery back-up. The RAM 101 is used for storing a user's telephone directory data and also messages.

In this embodiment, a RTC (real time clock) 102 is connected to the bus 92. The RTC 102 is used for normal time display. In addition, it is used for automatically transmitting a message at a predetermined time and also for recording the time when a message is received. For automatic transmission, the present invention has a transmission time designating circuit. This circuit comprises a register for storing a time designated by the user and a comparator for comparing the designated time with the actual time. When the designated time becomes the actual time, the circuit designates transmission of a desired message. It is possible to provide the register and comparator in the RTC 102 as well. The present invention further has a reception time register for recording a reception time. The processor 90 writes the time read out from the RTC 102 in the reception time register upon reception of a message. The automatic transmission and reception time recording may be made in non-speech communication via the line switching modem 80 in (3).

One of the features of the present invention is that packet switching communication is realized by the apparatus alone. To this end, it is assumed that a packet switching communication program is stored in the ROM 100. Actually, the packet switching communication program includes such necessary parts as a TCP/IP task, CDPD control task, a modem driver, etc. to be described later. In other words, the instant set, unlike the prior art scheme, is not controlled by any operating system and does not use any IC card or similar large capacity memory device as is necessary in the prior art system. In this respect, the present invention is set apart from the perfect PC constitution which must be adopted in the prior art scheme.

While constitution for packet switching communication by the present invention has been described so far, the present invention can also have the following additional functions.

1. Radio Circuit Capture Display Function

For packet switching communication with the present invention, the apparatus has to receive the assignment of a CDPD communication channel. The capturing of the channel may require some time. In this set, when channel assignment is made from a base station, this is displayed on the LCD 69 for the user's convenience. The user may instruct the transmission of a message after confirming the capturing of the radio circuit.

2. Character Conversion Function

The least number of keys necessary for realizing a normal telephone function is 10, i.e., 10 keys for the numerals "0" to "9". The present invention is adapted such that predetermined characters are expressed using inputs that are combinations of these numeral keys. For instance, such character conversion function is conceivable that the character "A" is input by depressing the key of numeral "1" twice in succession after switching of the normal input mode over to an expanded input mode, i.e., a character input mode. Thus, as large a number of keys as in the usual PC keyboard are unnecessary.

The packet switching communication function of the present invention as described above provides for the following uses.

1. Use of the set as a bi-directional pager mainly for relatively simple messages.

2. Securing desired information by accessing a database connected to the internet to which a gate-way function is provided by the CDPD base station. It is also possible to access mail in a private mail box.

3. Message communication to be made in case when it is impossible to carry out speech communication, such as during a meeting.

(3) Constitution for Realizing the Call Switching Modem Function

This constitution enables the present invention to function as a modem permitting line switching communication by a PC which is connected to the apparatus. In this case, the apparatus, when viewed from the RF, is a line switching modem with a PC function.

The constitution for realizing this function comprises an RS-232C interface for data transfer between the PC and the apparatus. The interface includes RS-232C driver, filter, etc.

With this interface, serial data inputted through the connector 95 to the port 94a of the processor 90 flows through the processor 90 to appear at the port 94b to be coupled via the switches 96 and 97 to the line switching modem 80 for digital conversion in the speech frequency band. Conversely, an analog signal received in the radio receiver 66 is demodulated into serial data. The set utilizes QAM modulation and utilizes an AMPS communication network as a communication network similar to speech communication. Thus, in the apparatus both a speech signal and a non-speech signal are treated in the same way during the radio transmission and reception.

The present invention is described such that data for non-speech communication is generated and edited on the PC side and that it acts as a modem for transmitting and receiving data.

In the case that the data itself is to be generated and edited in the apparatus, a non-speech communication program should be stored in the ROM 100. This program is commercially available as a data communication or a FAX communication.

When the present invention awaits reception, the modes A and B described in (2) are used, and the reception waiting by the line switching modem 80 is possible only in the mode A. The apparatus is accordingly adapted to be able to select a function in which continuous switching of the two modes by the modem controller 98 noted above is executed, thus obtaining both the line switching communication and packet switching communication (the state of such time division basis reception waiting being hereinafter referred to as "time division reception mode"). It should be noted that there would be no fear of missing any type of communication when the time division basis reception mode is switched in the order of milliseconds, for instance. The modem driven ensures the minimal time required for the reception processing for whichever one of the two modes is used for receiving communication in the time division basis reception mode.

As for the reception waiting modes, it is possible to provide an additional function, in which a power control circuit cuts off power supply to the hardware related to the mode A during when the mode B is being selected by the user, and vice versa. With this power turn-off function, the user can select either the prevention of missing reception in the time division reception mode or the improved battery life owing to a fixed mode.

The hardware constitution has so far been described by classifying its functions into (1) to (3) as above. The operation in each mode will be described hereinunder. Beforehand, the main software structure of the system will be described.

Figure 4:
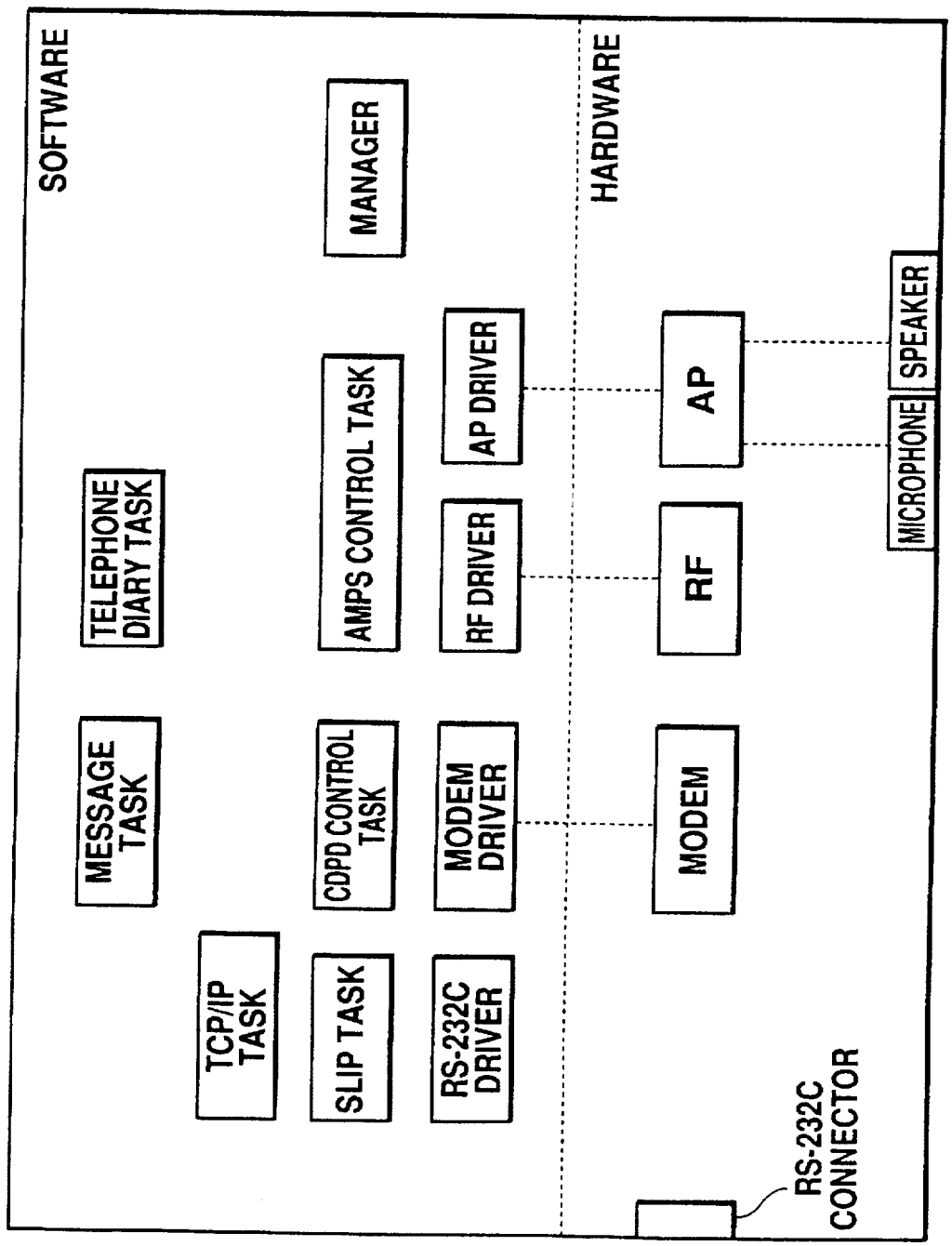
FIG. 4 is a diagram showing the software constitution of the embodiment of the apparatus and related hardware constitution thereof.

FIG. 4 shows the software constitution and related hardware constitution of the apparatus. In the Figure, the software is shown above the dashed line, and the hardware is shown below. Each software function as illustrated will now be described mainly in connection with its characteristic portion.

1. RS-232C Driver

This driver controls the RS-232C PC interface. It controls transmission and reception of such commands as ER, DR and RS and also data. According to the kind of command first received from the PC after ER, the driver judges which of the call switching modem 80, packet switching modem 82 or message task to be described later, data from the PC is to be transferred to. Specifically, the following data transfer is caused according to the kind of command.

With an usual AT command:

Data is transferred to the call switching modem 80.

With an expanded AT command specific to the set, which is a command for transferring data to the apparatus at the same time:

Data is transferred to a message task or a telephone diary task to be described later.

With an expanded AT command specific to the apparatus, which is a SLIP (to be described later) command:

Data is transferred to the packet switching modem 82.

Data from the PC can thus be delivered to a desired route.

2. Modem Driver

This driver is for such control as a decision as to whether to allow or prohibit the operations of the call and packet switching modems 80 and 82 via the modem controller 98 according to the operating mode.

3. RF Driver

This driver collectively controls the RF portion including the radio transmitter 64 and radio receiver 66. It also has functions of measuring received signal intensity, channel setting, transmission power level setting, etc.

4. AP Driver

This driver performs AP control according to the operating mode.

5. SLIP (Serial Link Internet Protocol) Task

This task executes a protocol conversion of IP packets for serial communication when carrying out communication with a PC.

6. CDPD Control Task

This task concerns data abbreviation according to CDPD standards, division of large amounts of data, etc.

7. AMPS Control Task

This task controls the AMPS communication.

8. Manager

The manager has roles of switching and control of the operating mode of the set.

9. TCP/IP (Transport Control Protocol/Internet Protocol) Task

This task is brought about when received data is received from the CDPD control task (i.e., packet switching modem 82 in terms of hardware). When the header part of the data is a message capable of being interpreted in the apparatus, the data is transferred to a message task to be described later. Otherwise, the data is transferred to the SLIP task (and thence transferred via the RS-232C driver to the PC). As a preamble of this task, it is necessary that at least the operation of the packet switching modem 82 is allowed when awaiting reception. That is, the reception awaiting mode has to be the mode B (i.e., waiting reception by the sole packet switching modem 82) or the time division basis reception mode.

10. Message Task

This task is for generally managing messages. In case where the user generates and edits messages, a user's interface is provided. In this sense, this task can be a data editing portion for message communication. Where messages are generated and edited on the PC side, the task controls message transfer between the PC and the present invention.

11. Telephone Diary Task

This task is for generally managing a user's telephone diary data. Where the user adds and edits telephone diary data, a user's interface is provided. In this sense, this task can be a data editing portion concerning telephone diary data. Where telephone diary data are generated and edited on the PC side, the task controls transfer of the telephone diary data between the PC and the present invention. The preceding message task and this telephone diary task can be called application software of the instant set.

12. Others

Although not shown, the software further includes a key driver for detecting key depression, an LCD driver for controlling the LCD 69, an RTC driver for controlling the RTC 102, an AMPS user's interface task for controlling a user's interface as a radio telephone set, and an environment task for user's interface control when performing such environment setting as time setting.

So far, the main software constitution of the present invention has been described. Now, the operation of the set with the FIG. 2 hardware constitution described above and the above software constitution, will be described in relation to the main operating modes. The mode switching may be switching instructed by a user's key depression as well as automatic switching as will be described later. In the former case, the key depression is transferred from the key driver to the manager for the mode switching.

(1) Radio Telephone

1. Transmission of Speech

User's speech is inputted from the microphone 60. This signal is subjected to bandwidth restriction processing in the transmission signal processing circuit 72 for transmission by the radio transmitter 64. It is assumed that in this case the present invention is in a mode called "AMPS communication transmission".

The transmission signal selecting circuit 74 selects a route extending from the microphone 60 via the transmission signal processing circuit 72 to the radio transmitter 64 for speech transmission.

2. Reception of Speech

In this case, the set has to be in the "AMPS reception waiting mode" or, in view of whether to allow or prohibit the modem operation, in the mode A noted above or the time division basis reception mode. In this state, a signal received by the radio receiver 66 is coupled via the received signal processing circuit 76 to the call switching modem 80. The call switching modem 80 and the modem driver decide that the received signal represents speech, thus allowing output from the loudspeaker 61.

Figure 5:
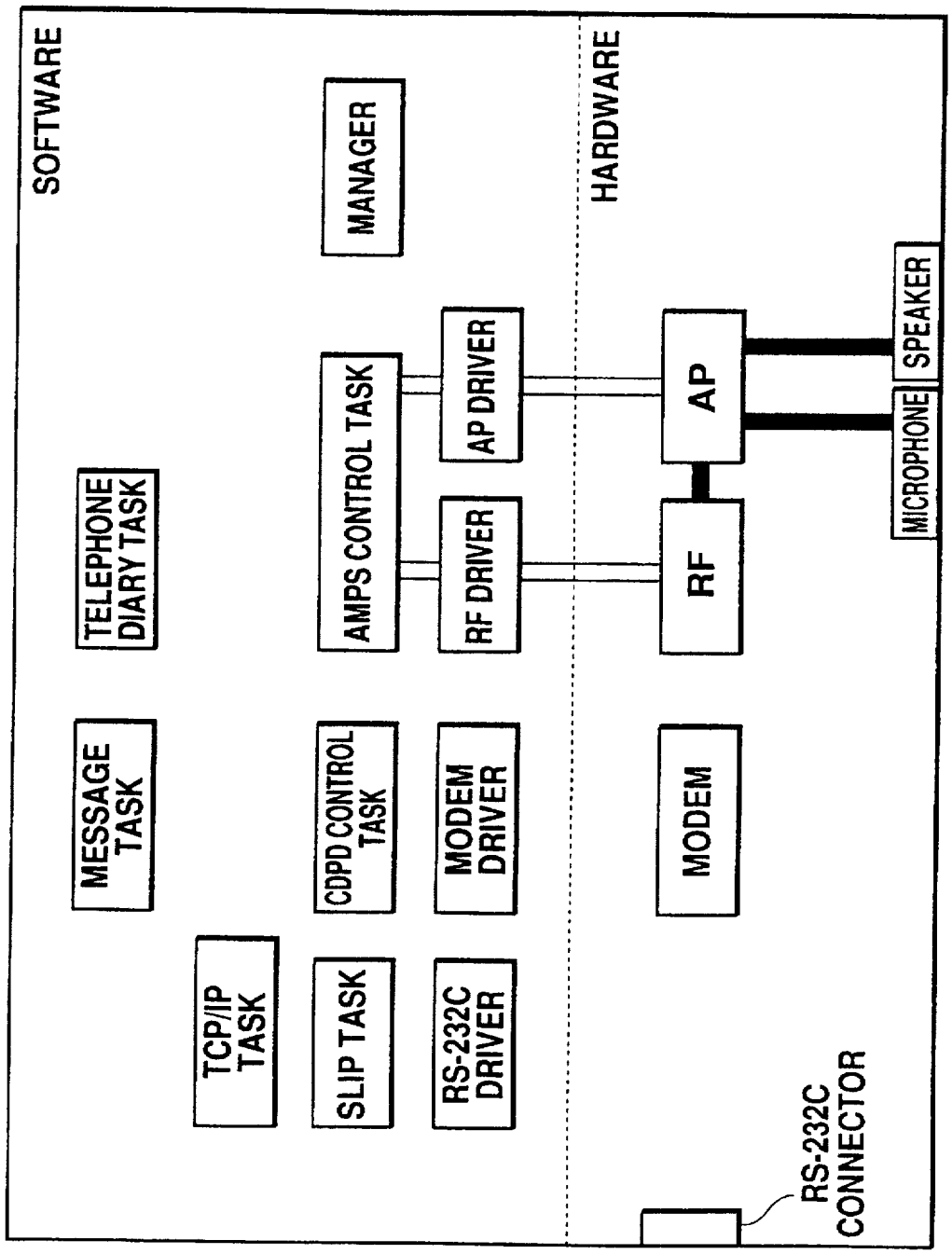
FIG. 5 is a diagram based on FIG. 4, and shows control and data flow when the embodiment of the apparatus is operated as a radio telephone set.

Main control and data flow in the operation of the set as a radio telephone set, is shown in FIG. 5 which is based on FIG. 4. In the Figure, the double lines show the control, and the bold lines show the flow of the signal.

(2) Packet Switching Communication (by the Present Invention Alone)

1. Generation and Editing of Message

In this case, the apparatus is in a "message input" mode. In this mode, the message task noted above can input or edit a message. The message thus provided is stored in the RAM 101.

2. Transmission and Reception of Message

For the transmission or reception of a message, the set is in a "packet switching communication" mode. A message is transmitted through a hardware route extending from the RAM 101 via the bus 92, processor 90, port 94b and packet switching modem 82 to the radio transmitter 64.

In reception, the mode B or time division basis reception mode noted above is set up in the packet switching communication mode. In any of these modes, data, when received, is led through the converse route to that described above to the RAM 101 for storage.

Figure 6:
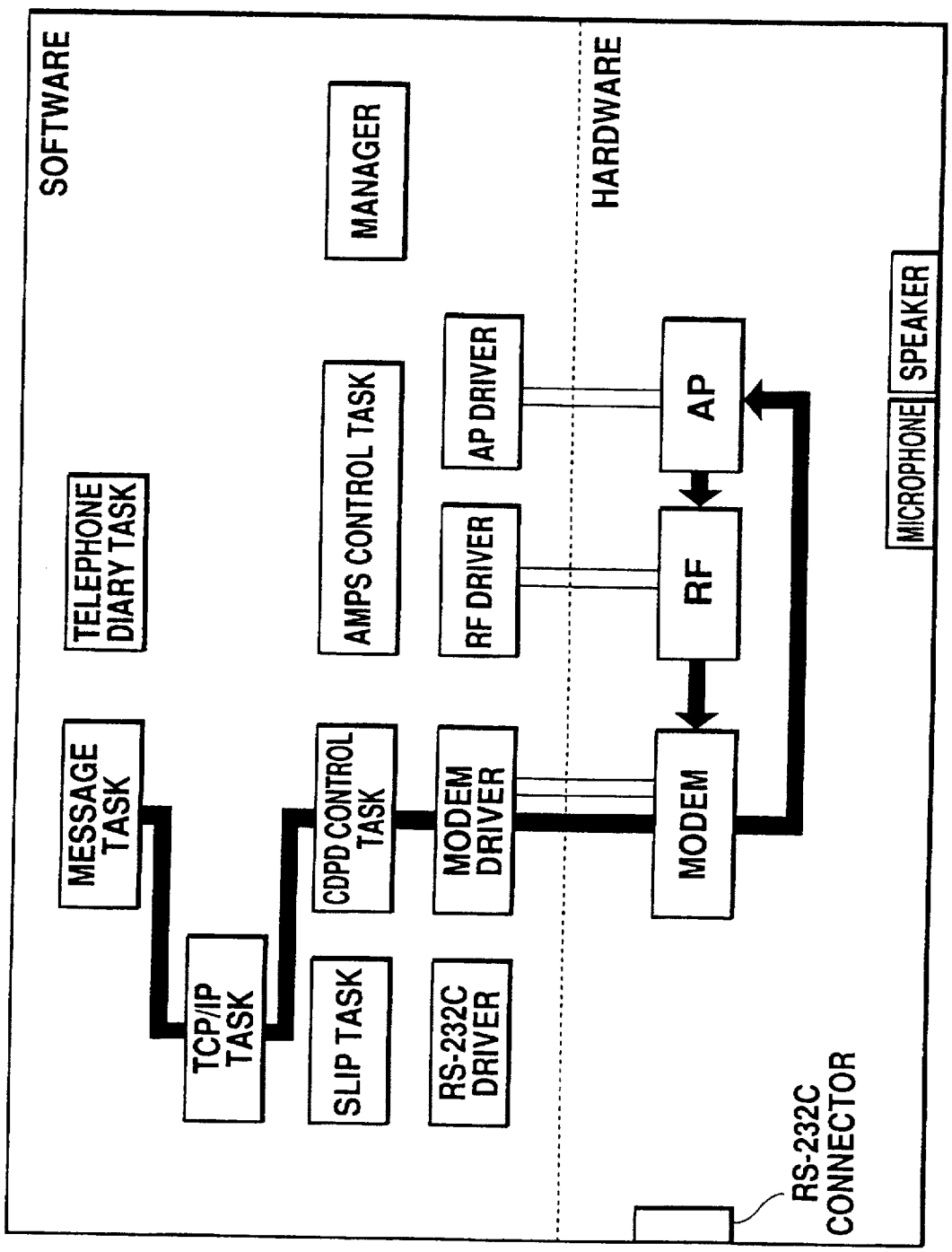
FIG. 6 is a diagram based on FIG. 4, and shows control and data flow when the embodiment of the apparatus is used alone for packet switching communication.

Main control and flow of data in the packet switching communication by the present invention alone, are shown in FIG. 6 which is based on FIG. 4.

(3) Packet Switching Communication (When PC is Connected)

1. Generation and Editing of Message

Message input by the present invention is possible when a PC is connected as well. This operation is the same as in (2) above.

2. Transfer of Message

A case of transferring a message generated or edited in the PC to the message task of the apparatus will be considered. In this case, a "PC message transfer" mode is set. When data is transferred from the PC via RS-232C to the port 94a of the processor 90, an RS-232C driver checks whether the data represents a message. This check is made according to the kind of command as described. When it is found that the data represents a message, the data is transferred to the message task. In terms of hardware, this operation corresponds to storing the message in a message storage area of the RAM 101.

Figure 7:
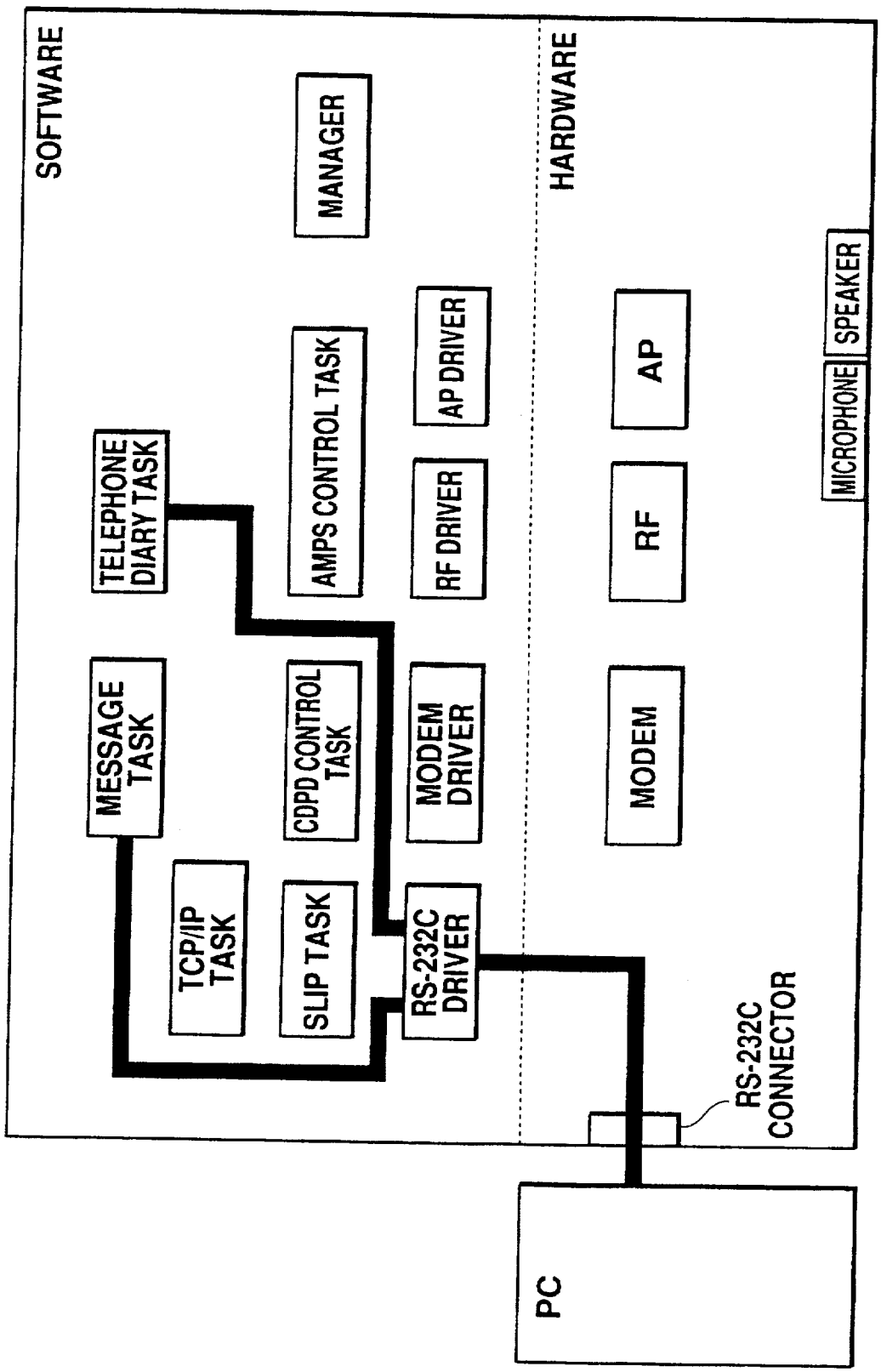
FIG. 7 is a diagram showing data flow when data from a PC is judged to be a message.

The flow of data in a case when PC data is found to be a message, is shown in FIG. 7. In the Figure, the bold lines show the flow of data. Telephone diary data is also shown because it can also be checked in the same manner as the message check.

3. Transmission and Reception of PC Data

When the RS-232C driver does not determine that the data represents any message in (2) above, such data is dealt with as data to be transmitted by the packet switching modem 82. At this time, the present invention is again switched to the "packet switching communication" mode. The data is transmitted through a route extending from the PC via the PC interface, port 94a of the processor 90, port 94b thereof and packet switching modem 82 to the radio transmitter 64. In reception, the route is converse.

Figure 8:
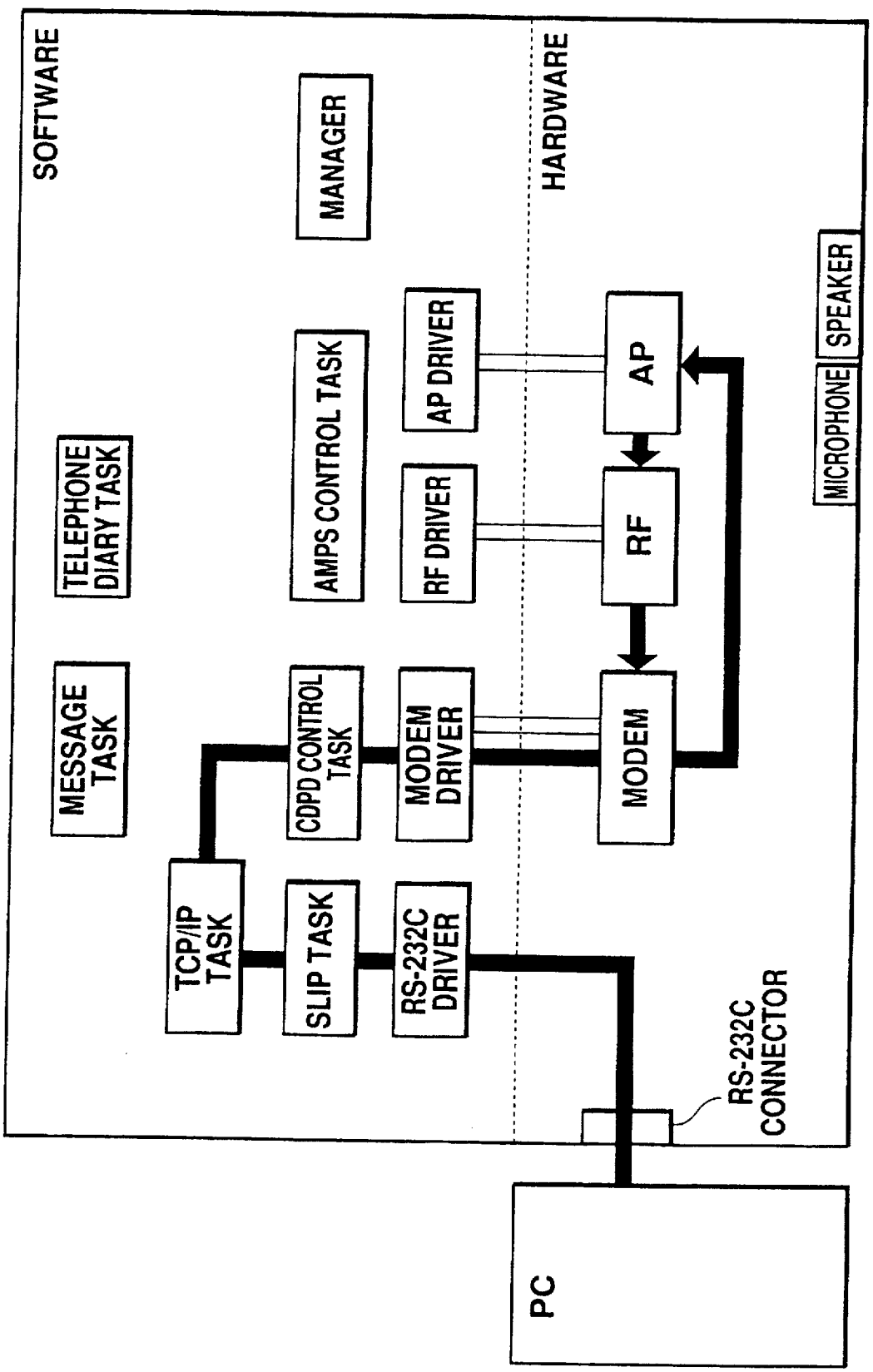
FIG. 8 is a diagram based on FIG. 4 showing control and data flow concerning packet switching communication when a PC is connected to the embodiment of the apparatus.

Control and data flow are as shown in FIG. 8, which is based on FIG. 4.

A conceivable example of utilizing the instant set as a modem with a radio transceiver for the CDPD communication, is in which communication necessary in such an application as PC electronic mail or FTP is carried out as radio communication.

(4) Call Switching Communication (When PC is Connected)

In this case, the mode of the apparatus is a "call switching communication" mode. This mode can be set up automatically as a result of the check of the PC data by the RS-232C driver as described above. As to whether the modem operation is to be allowed or prohibited, the call switching communication mode should be the mode A or the time division basis reception mode. In the call switching communication mode, data is transmitted through a hardware route extending from the PC via the PC interface, port 94a of the processor 90, port 94b thereof and call switching modem 80 to the ratio transmitter 64. In reception, the route is converse.

Figure 9:
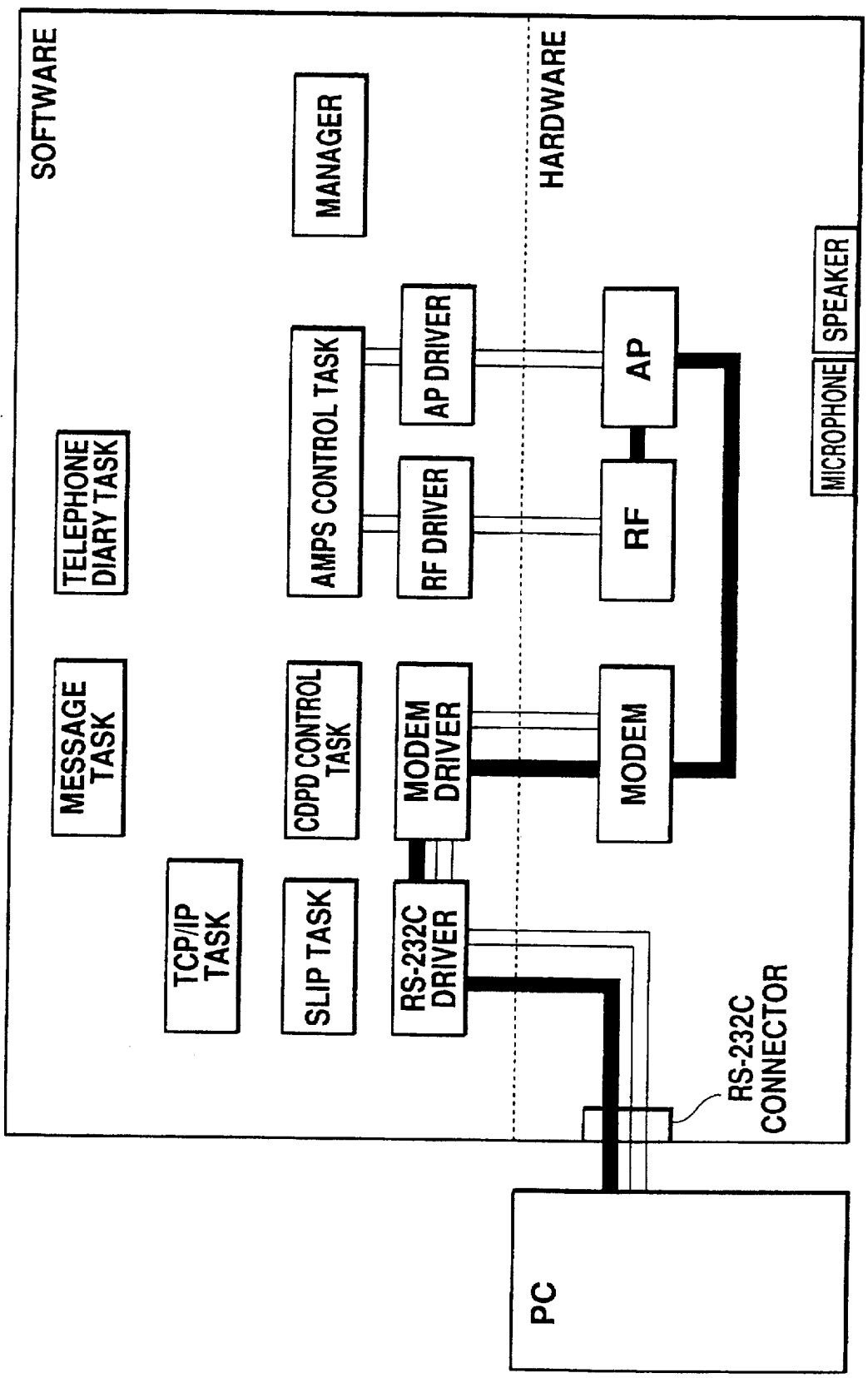
FIG. 9 is a diagram based on FIG. 4, and shows control and data flow concerning line switching communicating when a PC is connected to the embodiment of the set.

Control and flow of data are as shown in FIG. 9 which is based on FIG. 4.

A conceivable example of utilizing the present invention a modem with a radio transceiver for the AMPS communication is radio FAX communication by a PC.

The operation of the present invention has been described in connection with both hardware and software. Where various operating modes are provided, a case may arise in which a plurality of operations should be executed simultaneously. For example, it is desirable to enable communication of the apparatus in response to a telephone call even during transfer of a message to the message task of the set. Accordingly, the instant set is adapted such that a plurality of operating modes, which can be set up simultaneously, can be set up simultaneously in response to requests for setting up these modes. In other words, the set can be held in a plurality of modes simultaneously unless such modes are incapable of being set up simultaneously without collision of data or simultaneous use of the same hardware resources. Examples of such modes are the "AMPS speech transmission" mode as shown in FIG. 5 and the "PC message transfer" mode as shown in FIG. 7. As can be seen from these Figures, these two modes are free from collision of data.

To enable simultaneously setting up a plurality of modes, the manager noted above is required to have the following functions, it being assumed that the requests for setting up various operating modes are based the use of an interrupt.

1. A function of monitoring a mode setting-up request
2. A function of judging the content of a mode that is requested to be set up
3. A function of judging a plurality of modes capable of being simultaneously set up according to the contents of the modes For an operating mode setting-up request, generally, an interrupt request can be adopted. In this case, the manager may monitor an interrupt signal and the interrupt level. In the case of an operating mode setting-up request other than the interrupt (for instance a request by polling), a similar monitoring measure may be adopted.

While a preferred embodiment of the invention has been described, it is to be construed that the embodiment is by no means limitative and various changes and modifications may be made without departing from the scope and spirit of the invention.

What is claimed is:

1. A personal communication set with a radio transmitter and a radio receiver for respectively transmitting and receiving at least speech, a microphone for receiving speech to be transmitted, and a loud speaker for outputting received speech, comprising:

a processor for controlling the personal communication set in operating modes including transmission and reception;

an input accepting portion for accepting an input from a user for designating an operating mode of the personal communication set;

a memory portion for storing various programs to be executed on and data to be referred to by the processor;

a call switching modem for executing modulation of digital data capable of being processed by the processor to obtain an analog signal in a speech frequency band and also demodulation in the converse way;

a packet switching modem for executing modulation of digital data capable of being processed by the processor to obtain an analog signal in a frequency band exceeding the speech frequency band, and also demodulation in the converse way;

a transmission signal processing portion for carrying out bandwidth restriction processing of a speech base-band signal inputted from the microphone and an analog signal from the call switching modem;

a transmission signal selecting portion for selectively connecting either the transmission signal processing portion or the packet switching modem to the radio transmitter according to the operating mode of the personal communication set in transmission;

a transmission program for radio transmitting desired data stored in the memory portion via the packet switching modem when the packet switching modem is connected to the radio transmitter;

a received signal processing portion for carrying out bandwidth restriction processing of a signal received by the radio receiver;

a modem control portion for deciding whether the line switching modem and packet switching mode are to be operated according to the operating mode of the personal communication set in reception; and a loudspeaker control portion for deciding whether the bandwidth restriction signal obtained in the received signal processing portion is to be outputted to the loudspeaker according to the operating mode of the personal communication set in reception;

wherein elements set forth above are accommodated in a same housing.

2. The personal communication set according to claim 1, which further comprises a personal computer interface portion for permitting transfer of data between the personal communication set and a personal computer.

3. The personal communication set according to claim 2, wherein the personal computer interface portion permits serial data communication between the personal communication set and the personal computer.

4. The personal communication set according to claim 1, which further comprises a data editing portion for editing digital data capable of being processed by the processor.

5. The personal communication set according to claim 1, which further comprises an information display portion for visually displaying predetermined information according to an instruction of the processor.

6. The personal communication set according to claim 1, which further comprises a time detecting portion for detecting time and being accessible in each operating mode.

7. The personal communication set according to claim 6, which further comprises a transmission time designating portion for designating a time of transmission of desired digital data by the radio transmitter, the desired digital data being transmitted automatically when the time designated by the transmission time designating portion reaches the time detected by the time detecting portion.

8. The personal communication set according to claim 6, which further comprises a reception time recording portion for recording the time detected by the time detecting portion upon data reception by the radio receiver.

9. The personal communication set according to claim 1, which further comprises a reception notifying portion for notifying data reception by the radio receiver upon data reception.

10. The personal communication set according to claim 9, wherein the reception notifying portion notifies the occurrence of the data reception by generating at least one of vibrations and audible sound.

11. The personal communication set according to claim 10, wherein the at least one of vibrations and audible sound generated by the reception notifying portion vary in at least one of frequency, intensity and duration, depending on whether the received signal is to be outputted to the loudspeaker, demodulated by the call switching modem, or demodulated by the packet switching modem.

12. The personal communication set according to claim 1, wherein the call switching modem modulates the digital data into an analog signal capable of being transmitted in an AMPS communication system, while the packet switching modem modulates the digital signal into an analog signal capable of being transmitted in a CDPD communication system.

13. The personal communication set according to claim 12, wherein the call switching modem modulates the digital data using QAM modulation, while the packet switching modem modulates the digital data using GMSK modulation.

14. The personal communication set according to claim 12, which further comprises an information display portion for visually displaying predetermined information according to an instruction of the processor, notification being shown on the information display portion when a radio line, through which the packet switching modem transmits data is captured.

15. The personal communication set according to claim 1, wherein the input accepting portion includes keys for displaying at least numerals "0" to "9", the personal communication set further comprising a character generating portion for converting combinations of inputs of the keys into characters other than the numerals.

16. The personal communication set according to claim 1, which can set a reception waiting mode, to one of:

a first mode, in which operation of solely the call switching modem is allowed; and a second mode, in which operation of solely the packet switching modem is allowed.

17. The personal communication set according to claim 16, which further comprises a power turn-off portion for turning off power supplied to a circuit related to the second mode when the first mode is set up as the reception waiting mode and turning off power supplied to a circuit related to the first mode when the second mode is set up as the reception waiting mode.

18. The personal communication set according to claim 17, which further comprises a mode switching portion for switching the first mode and the second mode on a time division basis.

19. The personal communication set according to claim 2, which permits setting a mode allowing operation of at least a packet switching mode when awaiting reception, and which further comprises:

a demodulated data judging portion for judging a content of digital data demodulated by the packet switching modem when it is in the packet switching mode, the digital data being transmitted through the personal computer interface portion to the personal computer when it is judged that the content of the digital data is to be transmitted to the personal computer.

20. The personal communication set according to claim 19, wherein the demodulated data judging portion transmits the digital data demodulated by the packet switching modem to the personal computer when a header part of the digital data is incapable of interpretation in the personal communication set itself.

21. The personal communication set according to claim 2, which further comprises:

a data editing portion for editing digital data capable of being processed by the processor; and a personal computer data judging portion for judging a content of data transmitted from the personal computer through the personal computer interface portion;

the data transmitted from the personal computer being transferred to one of the call switching modem, the packet switching modem, and the data editing portion according to the content of the data transmitted from the personal computer.

22. The personal communication set according to claim 21, wherein the personal computer data judging portion judges the content of the data according to a kind of communication command transmitted from the personal computer.

23. The personal communication set according to claim 2, which further comprises:

a monitoring portion for monitoring generation of a mode setting request for setting each operating mode;

a first judging portion for judging a content of the operating mode set up by the mode setting request; and a second judging portion for judging a plurality of operating modes capable of being set up simultaneously according to the content of the operating mode set up by the mode setting request.

24. The personal communication set according to claim 23, wherein the mode setting request is an interrupt request to the processor.

* * * * *